US012716842B2

(12) United States Patent
Speck et al.

(10) Patent No.: US 12,716,842 B2
(45) Date of Patent: Aug. 25, 2026

(54) CALIBRATION STANDARD, SENSOR ARRANGEMENT AND USE

(71) Applicant: Endress+Hauser Conducta GmbH+Co. KG, Gerlingen (DE)

(72) Inventors: Matthäus Speck, Göpfersdorf (DE); Andreas Bayer, Gerlingen (DE); Thilo Krätschmer, Gerlingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 172 days.

(21) Appl. No.: 18/531,911

(22) Filed: Dec. 7, 2023

(65) Prior Publication Data

US 2024/0241053 A1 Jul. 18, 2024

(30) Foreign Application Priority Data

Dec. 9, 2022 (DE) ..................... 10 2022 132 820.1
Nov. 27, 2023 (DE) ..................... 10 2023 133 021.7

(51) Int. Cl.
*G01N 21/64* (2006.01)

(52) U.S. Cl.
CPC ......... *G01N 21/645* (2013.01); *G01N 21/643* (2013.01); *G01N 21/6486* (2013.01); *G01N 2201/127* (2013.01); *G01N 2201/13* (2013.01)

(58) Field of Classification Search
CPC ............... G01N 21/645; G01N 21/643; G01N 21/6486; G01N 2201/127; G01N 2201/13
See application file for complete search history.

(56) References Cited

U.S. PATENT DOCUMENTS 4,662,745 A * 5/1987 Zupanick ............. G01N 21/278 250/252.1
5,186,046 A * 2/1993 Gouterman ............. G01M 9/06 73/705

(Continued)

FOREIGN PATENT DOCUMENTS

CN 1908957 A 2/2007
CN 100501389 C 6/2009

(Continued)

OTHER PUBLICATIONS

Praseodymium doped YF3:Pr3+ nanoparticles as optical thermometer based on luminescence intensity ratio (LIR) Studies in visible and NIR range (Year: 2019).*

(Continued)

*Primary Examiner* — Uzma Alam
*Assistant Examiner* — Fani Polyzos Boosalis
(74) *Attorney, Agent, or Firm* — Gil M. Repa; Endress+Hauser (USA) Holding, Inc.

(57) ABSTRACT

A calibration attachment for adjusting, calibrating, and/or performing a functional check of an optical sensor, which is configured to measure at least one measured variable in a medium by light, wherein the sensor is designed to emit transmitted light of at least one wavelength in the range of 200-700 nm, in particular 200-500 nm, includes a housing and a body, which is arranged in the housing, wherein the body includes praseodymium and cerium, and wherein the body, after excitation with the transmitted light, emits light of a different, in particular longer, wavelength. A sensor arrangement includes such a calibration attachment and use thereof.

22 Claims, 4 Drawing Sheets

(56) References Cited

U.S. PATENT DOCUMENTS

| | | | | |
|---|---|---|---|---|
| 6,285,454 | B1 * | 9/2001 | Douglas | G01N 21/8483<br>356/246 |
| 2021/0356376 | A1 | 11/2021 | Closson et al. | |

FOREIGN PATENT DOCUMENTS

| | | | | | |
|---|---|---|---|---|---|
| CN | 111295580 | B | * | 9/2023 | G01N 21/6428 |
| DE | 102006031534 | A1 | | 1/2008 | |
| DE | 102021133467 | A1 | | 6/2023 | |
| EP | 2653854 | A1 | * | 10/2013 | G01N 21/274 |
| JP | 2003172714 | A | | 6/2003 | |
| JP | 3878007 | B2 | | 2/2007 | |
| WO | WO-0017627 | A1 | * | 3/2000 | G01N 21/645 |
| WO | WO-2023023756 | A1 | * | 3/2023 | H10D 48/385 |

OTHER PUBLICATIONS

Praseodymium doped ceria: A new sight on coupled thermo-mechanical properties and oxygen vacancy diffusion via statistical moment approach (Year: 2024).*

* cited by examiner

51

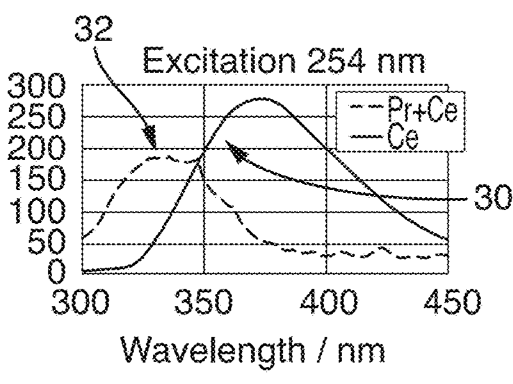
Fig. 5a
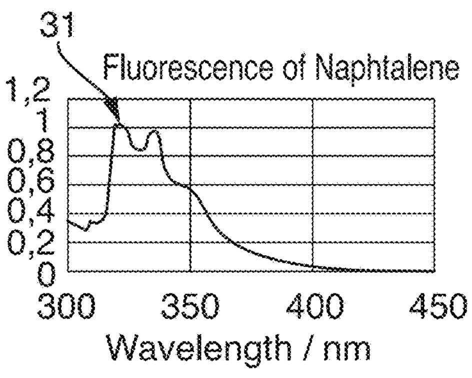
Fig. 5b
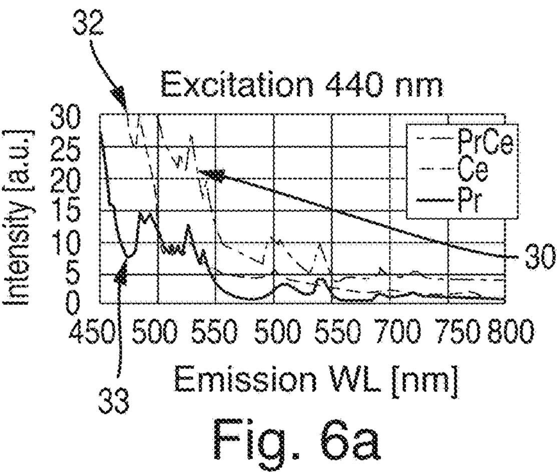
Fig. 6a
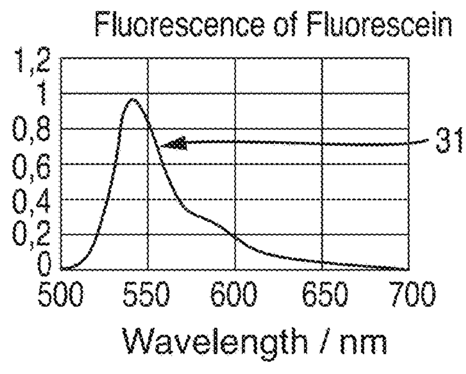
Fig. 6b
Fluorescence of Rhodamine
Intensity / norm.
1,2 1 0,8 0,6 0,4 0,2 0
31
500 600 700 800
Wavelength / nm
Fig. 6c
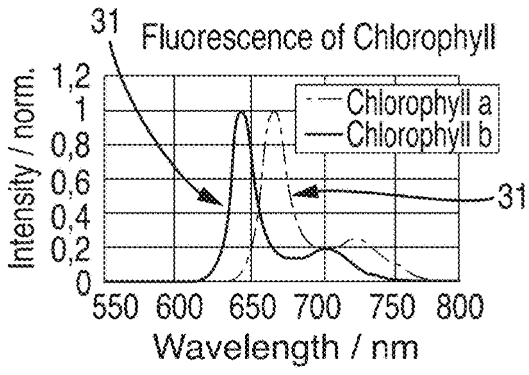
Fig. 6d

CALIBRATION STANDARD, SENSOR ARRANGEMENT AND USE

CROSS-REFERENCE TO RELATED APPLICATIONS

The present application is related to and claims the priority benefit of German Patent Application No. 10 2022 132 820.1, filed Dec. 9, 2022, the entire contents of which are incorporated herein by reference.

TECHNICAL FIELD

The invention relates to a calibration standard for adjusting, calibrating, and/or for carrying out a functional check of an optical sensor, to a sensor arrangement, and to use.

BACKGROUND

The sensor is a fluorescence sensor. In fluorescence measurement, the medium is generally irradiated with a short-wave excitation light (transmitted light) and the longer-wave fluorescent light (received light) that is generated by the medium and that is generated as a function of the concentration of the species to be measured is detected. The fluorescence sensor comprises a light source and a receiver. The light source transmits transmitted light; the receiver receives received light. When speaking of "fluorescence" or a "fluorescence sensor" in this context, it should generally be understood to mean luminescence or a luminescence sensor. "Fluorescence" thus also includes "phosphorescence."

Such a fluorescence sensor must, at regular intervals, be subjected to a functional test and/or calibrated. For this purpose, either corresponding standard liquids or solids with defined fluorescence can be used in liquid measuring devices. It is of central importance here that the emitted fluorescence intensity of the standard is stable against environmental influences, aging and the exciting UV radiation.

In the case of liquid standards, aging can be observed very quickly; a clear change in the fluorescence intensity results after a few days already. In addition, the handling of liquids is cumbersome.

Solid standards available on the market often contain organic material, e.g., on a PMMA basis. This results in a strong degradation of the fluorescence signal, which is caused by the exciting UV radiation.

SUMMARY

The object of the invention is to overcome the described disadvantages. In particular, in the case of optical sensors, it should be possible to perform universal and complete calibration with long-term stable calibration means.

The object is achieved by a calibration attachment for adjusting, calibrating, and/or for carrying out a functional check of an optical sensor, which is designed to measure at least one measured variable in a medium by means of light, wherein the sensor is designed to emit transmitted light of at least one wavelength in the range of 200-700 nm, in particular 200-500 nm, comprising a housing and a body, which is arranged in the housing, wherein the body comprises praseodymium and cerium, and wherein the body, after excitation with the transmitted light, in particular by absorption of the transmitted light, emits light of a different, in particular longer, wavelength.

For this purpose, either the praseodymium and the cerium, which is comprised by the body, must be located at the surface of the body or the body per se is substantially transparent to the excitation wavelength, i.e., the transmitted light.

One embodiment provides that the body as such is substantially transparent to the transmitted light and the received light. The body is thus translucent to the transmitted light. In this respect, the body behaves similarly to the liquid medium to be measured; the medium is also transparent to the transmitted light and received light.

One embodiment provides for the surface of the body to be designed to be smooth. It is thus not a Lambertian surface (a Lambertian surface is a surface with absolutely matte reflection properties, i.e., a surface that follows Lambert's cosine law) so that as little reflection or scattering as possible takes place at the surface.

It has been found that not all lanthanides or all rare-earth metals are equally suitable, despite the similarities that this group has. The combination of praseodymium and cerium has the precisely correct and sufficiently strong fluorescence signal, which a single rare-earth metal, for example, does not have.

In order to provide solid reference standards for inline process spectroscopy, for example, for the fluorescence measurement of liquids, doped glasses are typically used according to the requirements. An alkali/alkaline-earth phosphate glass basis has proven successful here due to good processability in combination with high permeability in the ultraviolet spectral range. In one embodiment, an alkali/alkaline-earth phosphate glass is thus used for the body. In general, it is a glass body, in particular made of an inorganic glass. A barium phosphate glass which has been doped with praseodymium and cerium has now proven to be particularly suitable in this context. One embodiment provides that it is a glass body made of a quartz glass.

In contrast, inclusion of praseodymium and cerium in an acrylic, e.g., acrylic glass (polymethyl methacrylate), is less suitable. Depending on the wavelength used, the acrylic is not transparent, energy is absorbed, and the body is thus warmed, which is often not desired.

According to the prior art, a $Ce^{3+}$-doped phosphate glass with similar absorption and emission behavior in comparison to the analyte, e.g., phenanthrene, can be used as the standard for process monitoring, e.g., in aqueous media. A disadvantage of the latter reference standard is not only the limited area of application (for only a few analytes) but especially the relatively broad emission, strongly dependent on the production, around 375 nm (in the case of an excitation wavelength of 254 nm, see below).

In this context, it has now been found that a reference standard is obtained by co-doping a body, e.g., a glass body, e.g., a barium phosphate glass, with praseodymium ($Pr^{3+}$) and cerium ($Ce^{3+}$). The combination of these lanthanide ions in the barium phosphate glass leads to synergistic effects as a result of possibly occurring matrix effects as well as energy or charge transfer processes between the lanthanide centers in the glass.

For checking the measurement accuracy, the functions, and for the possibility of recalibration or adjustment of fluorescence sensors, in the present case, a solid standard was invented, which provides a suitable fluorescence measurement value, which is stable to a significantly higher degree against aging, environmental influences, and the excitation radiation than previously available concepts.

The stated object is achieved by using the combination of praseodymium and cerium. A sufficiently strong fluorescence signal in the wavelength range of 250-800 nm is generated. Due to the possible application in the UV range with transmitted light of 200-700 nm, the stability against the exciting UV light is particularly critical, which is less important in other wavelength ranges such as infrared.

As has been found in the use of the combination of praseodymium and cerium, the fluorescence intensity in the measurement range does not change at all or changes very little under the following influences:

Multi-day irradiation with the excitation light of the fluorescence measuring device Humidity changes Storage over several years One embodiment provides that the emission of the light with the different, in particular longer, wavelength takes place in the volume of the body. The fluorescence thus takes place in the volume of the body. In principle, fluorescence takes place everywhere where light can reach in the body. The body itself is substantially transparent to the transmitted light (see below) so that fluorescence is emitted from the entire three-dimensional body.

Since all fluorescence takes place in the volume, i.e., in the interior, of the body, the body is also protected and inert against environmental influences. This would not be the case with two-dimensional bodies with only one surface coating. The body is thus also not subject to any aging processes.

One embodiment provides that the body is a glass body, in particular, made from an inorganic glass.

One embodiment provides that the glass body is doped with praseodymium and cerium.

One embodiment of the glass body provides that a barium phosphate glass co-doped with praseodymium ($Pr^{3+}$) and cerium ($Cer^{3+}$) is obtained by heating a mixture, for example, of 8518 g $P_4O_{10}$, 6133 g BaO, 1390 g $Pr_2O_3$ and 2 g $Ce_2O_3$, in a corundum crucible in 60 min for 120 min to 1200° C. and subsequently casting it into a casting mold temperature-controlled to 450° C. In this case, the mixture is heated under a $N_2$ atmosphere.

One embodiment of the glass body provides that a different praseodymium oxide or praseodymium compound and a different cerium oxide or a different cerium compound are used to produce the glass body.

One embodiment of the glass body provides that a praseodymium oxide previously doped with cerium or a different praseodymium compound previously doped with cerium is used to produce the glass body.

One embodiment provides that the glass body is doped by ion exchange.

One embodiment provides that cerium-doped praseodymium oxide or a different praseodymium compound is brought as particles, crystals or the like into a glass melt or glass ceramic and is melted or sintered in.

One embodiment provides that a glass body containing $Ce^{3+}$ and $Pr^{3+}$ is produced by fusing two glasses, wherein one of the two is a non-coloring glass and the other is a colored glass comprising a praseodymium compound, in particular praseodymium oxide, and a cerium compound, in particular cerium oxide, or a combination compound. After the actual manufacturing by fusing and doping, the glass body does no longer have to be further processed.

One embodiment provides that the glass body comprises a glass-ceramic and/or partially crystalline material.

One embodiment provides that the body is a plastic body.

One embodiment provides that a praseodymium-containing and cerium-containing compound is admixed to the glass or plastic body containing $Ce^{3+}$ and $Pr^{3+}$.

One embodiment provides that the body is mounted in the housing via a mechanical holder.

One embodiment provides that the body is designed to be disk-shaped or lens-shaped.

For the use as a solid standard, a sample of the respective glass is brought in the form of either a disk or a lens-like melt bead into a mechanical mount, which can be attached onto the sensor (see below).

One embodiment provides that the housing comprises a receptacle for the sensor.

One embodiment provides that the housing is substantially transparent to the transmitted light.

One embodiment provides that the housing comprises an opening and transmitted light impinges on the body through the opening.

The object is furthermore achieved by a sensor arrangement comprising at least one light source, wherein the light source emits transmitted light of at least one wavelength in the range of 200-700 nm; at least one receiver, which is designed to receive received light of a greater wavelength than the transmitted light, in particular of a wavelength of 250-800 nm; and a calibration attachment as described above, wherein the light emitted by the body forms the received light.

In one embodiment, the sensor is a fluorescence sensor. In general, fluorescence is defined here as the emission of light of a wavelength that results from the absorption of light of a different, in particular shorter, wavelength. "Fluorescence" or "fluorescence sensor" thus in general means luminescence or luminescence sensor. "Fluorescence" thus also includes "phosphorescence."

The object is furthermore achieved by the use of praseodymium and cerium, in particular of a body doped with praseodymium and cerium, e.g., a glass body, for adjusting, calibrating, and/or for carrying out a functional check of an optical sensor, wherein the sensor is designed to emit transmitted light of at least one wavelength in the range of 200-700 nm.

The object is furthermore achieved by the use of praseodymium and cerium, in particular of a body doped with praseodymium and cerium, e.g., a glass body, for adjusting, calibrating, and/or for carrying out a functional check of an optical sensor, wherein the sensor is designed to determine the content of a polycyclic aromatic hydrocarbon.

The object is furthermore achieved by the use of praseodymium and cerium, in particular of a body doped with praseodymium and cerium, e.g., a glass body, for adjusting, calibrating, and/or for carrying out a functional check of an optical sensor, wherein the sensor is designed to determine the content of biomass, in particular chlorophyll and/or algae.

The object is furthermore achieved by the use of praseodymium and cerium, in particular of a body doped with praseodymium and cerium, e.g., a glass body, for adjusting, calibrating, and/or for carrying out a functional check of an optical sensor, wherein the sensor is designed to determine the content of rhodamines or fluorescein, in particular uranine.

BRIEF DESCRIPTION OF THE DRAWINGS

This is explained in more detail with reference to the following figures.

FIGS. 5*a* and 5*b* show emission spectra of the body according to the present disclosure at an excitation wavelength and a fluorescence spectrum of naphthalene, respectively;

FIGS. 6*a*-6*d* show emission spectra of the claimed body at an excitation wavelength and fluorescence spectra of fluorescein, rhodamine, and chlorophyll, respectively.

Figure 1:
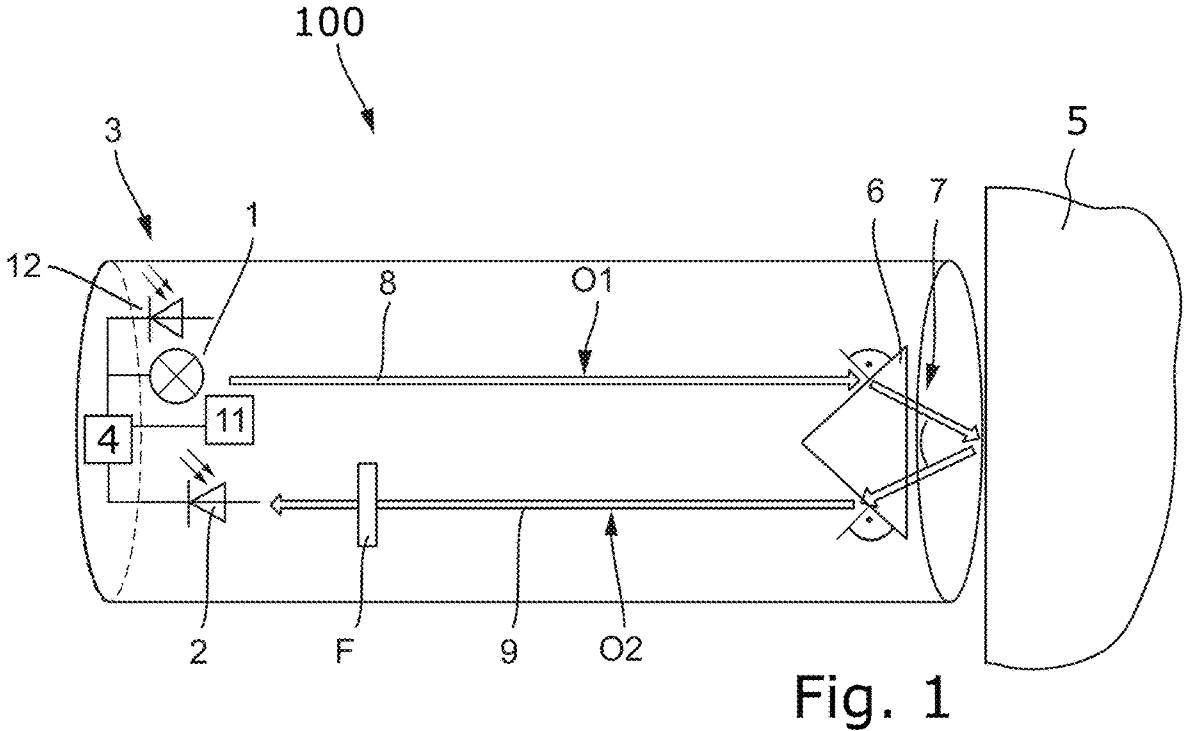
FIG. 1 shows a sensor according to the present disclosure in a schematic, cross-sectional view.

In the figures, the same features are labeled with the same reference signs.

DETAILED DESCRIPTION

The claimed calibration attachment 50 is suitable for adjusting, calibrating, and/or for carrying out a functional check of an optical sensor 100, which is designed to measure at least one measured variable in a medium 5 by means of light, wherein "light" is transmitted light or received light (see below). The sensor is a fluorescence sensor, which is to be discussed first. The sensor in its entirety is denoted by reference sign 100 and is shown schematically in FIG. 1. FIG. 2 shows the sensor 100 with its housing 10 and an optical window 7.

In principle, the sensor 100 is suitable for determining the oil-in-water content of a medium 5 or for determining the content of a polycyclic aromatic hydrocarbon in flue gas scrubbing, for example, on ships. These are, for example, naphthalene or phenanthrene. Other applications are however possible. Mention should be made here of the measurement of acetylsalicylic acid or the application in food analysis, e.g., of vitamins, or linoleic acid or material differentiation by means of fluorescence markers.

Mention should also be made of other applications from the area of biomass, e.g., for detecting chlorophyll in algae. Further examples include the measurement of rhodamines or fluorescein, in particular, uranine, which is explained below with reference to FIG. 5 and FIG. 6.

Figure 2:
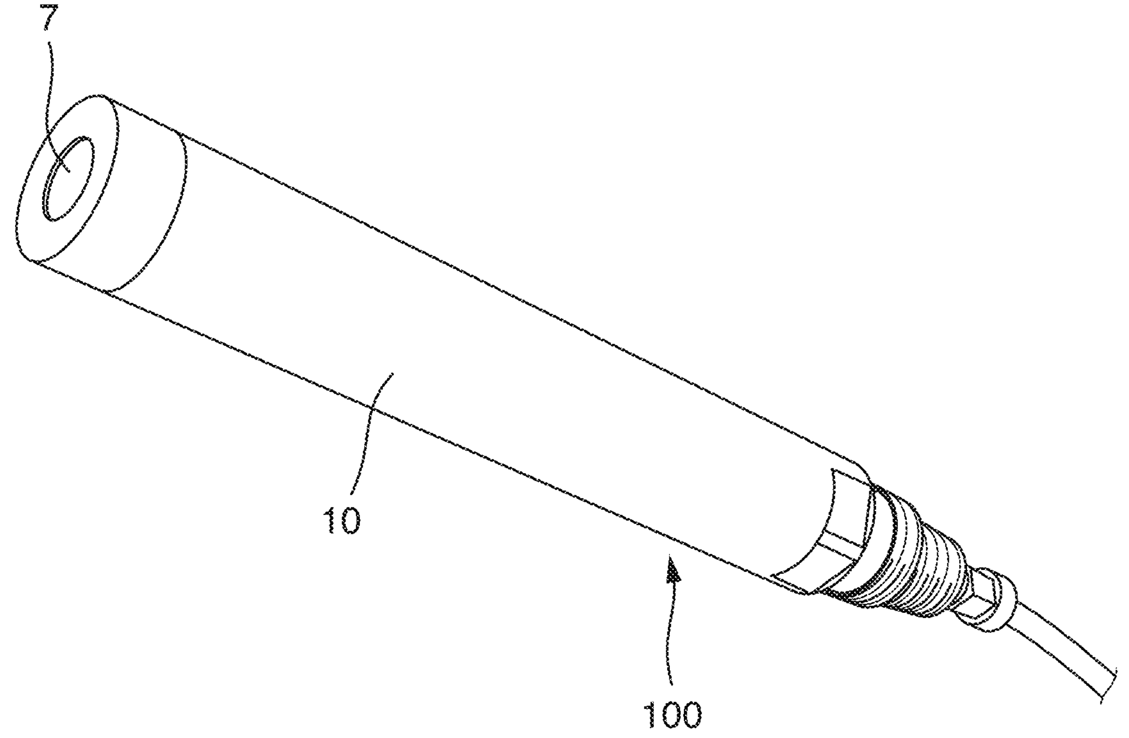
FIG. 2 shows a perspective view of the sensor of FIG. 1.

FIG. 1 shows the sensor 100 during measurement operation. The calibration operation is discussed below with reference to FIG. 3.

A light source 1 transmits transmitted light 8 toward the medium 5. The light source 1 is, for example, an LED which emits light of a wavelength of 200-700 nm, e.g., 255 nm. It is also possible to use a laser as the light source, or Xenon or mercury gas discharge lamps (254 nm), optionally with corresponding frequency filters.

The sensor 100 comprises a data processing unit 4, e.g., a microcontroller. The data processing unit 4 controls the light source 1 to transmit transmitted light 8 toward the medium 5 (measurement operation) or calibration attachment 50 (calibration operation, FIG. 3). The LED 1 is, for example, operated with a settable current source. The amplitude of the transmitted light is approximately proportional to the operating current of the LED 1.

The transmitted light 8 impinges on a prism 6 at an angle. The prism 6 is a right-angled prism, for example. The base points toward the medium 5 to be measured. A first optical path from the light source 1 to the prism 6 results. The optical path may also contain one or more lenses or filters.

The transmitted light 8 is partially converted into received light 9 in the medium 5 by fluorescence as a function of the concentration of the substance to be measured in the medium 5. The received light 9 takes the path toward the receiver 2 via the prism 6.

The receiver 2 is a photodiode, which receives the received light 9 at a wavelength of 250-800 nm. The filter F in FIG. 1 filters, for example, for wavelengths of 340-380 nm.

In principle, the receiver 9 is able to measure in a broader range, e.g., from 190-1100 nm. A second optical path from the prism 6 to the receiver 2 results. The optical path may also contain one or more lenses or filters. The first and second optical paths are substantially parallel to one another on the side of the prism facing away from the medium.

The sensor 100 comprises a monitor diode 12, which monitors the transmission power of the LED 1.

The sensor 100 comprises a temperature sensor 11, which measures the temperature of the light source 1.

The light source 1, prism 6, and receiver 2 are arranged in a housing 10. The housing is tube-shaped, with a diameter of 35-75 mm. The housing 10 comprises an optical window 7, which is permeable at least to transmitted light 8 and received light 9, wherein the prism 6 and the window 7 are either cemented, glued, joined together, or manufactured from one piece. In one embodiment, the individual components are separate. The distance from the light source 1 or the receiver 2 to the window 7 is approximately 2-6 cm.

The filter(s) are designed as wavelength filters, e.g., as interference filters.

Figures 3, 4:
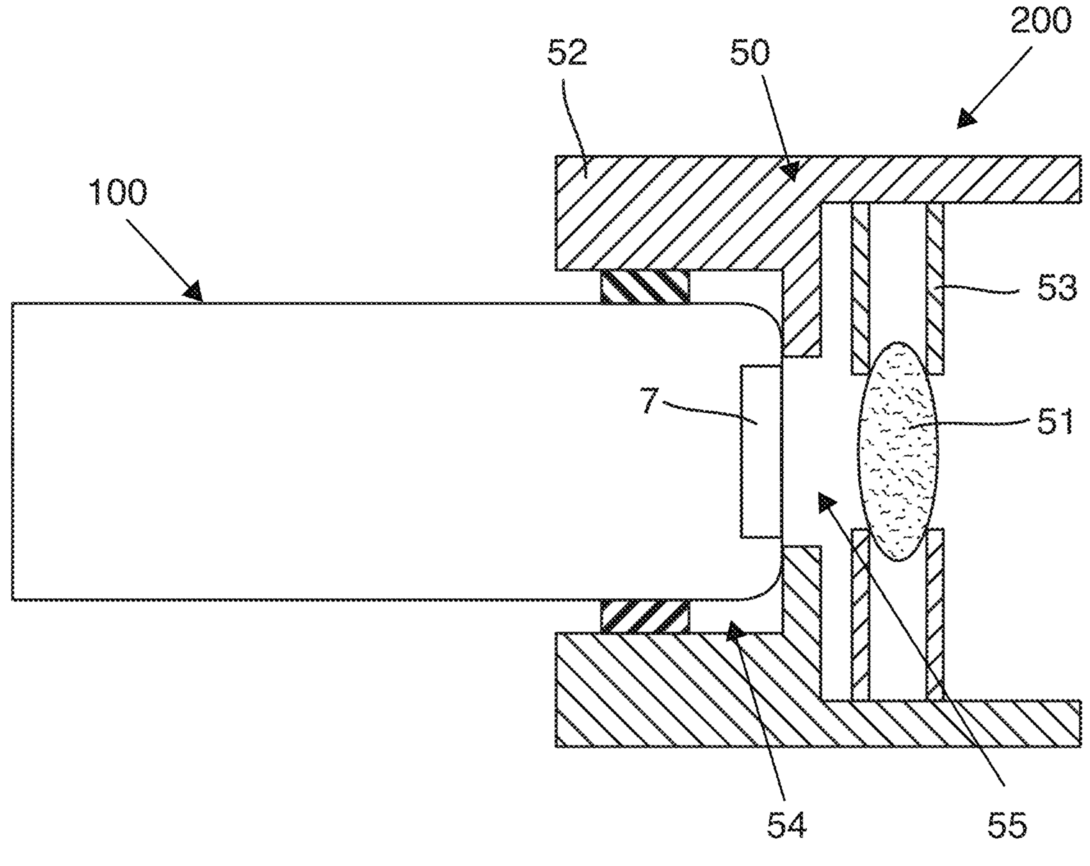
FIG. 3 shows a schematic, cross-sectional view through a calibration attachment according to the present disclosure.
FIG. 4 shows a perspective view of a body with praseodymium and cerium.

FIG. 1 describes the sensor 100 in measurement operation. With reference to FIG. 3, the calibration operation with the calibration attachment 50 is now discussed, wherein, from an optical point of view, the medium 5 is only exchanged with the calibration attachment 50 or body 51.

By means of the calibration attachment 50, the optical sensor 100 can be adjusted, calibrated, and/or a functional check can be performed. The calibration attachment 50 has a housing 52, which is manufactured from plastic, for example. In principle, the calibration attachment 50 can also be manufactured from a metal such as aluminum or from stainless steel.

The housing 52 has a receptacle 54 for the sensor 100. Thereby, the sensor 100 reaches the correct location and the transmitted light or received light can reach the body 51 via the optical paths from the light source 1. For this purpose, the housing 52 has an opening 55. In principle, a variant without an opening is also possible; the housing 52 must then be transparent to the corresponding wavelengths of the light source 1 or after conversion. The housing 52 can completely enclose the body 51 (see below). In one embodiment, the housing 52 with the body 51 in its interior is sealed, in particular, hermetically sealed, against the outside world. As a result, no water, steam, dust or the like can penetrate.

The body 51 is arranged in the interior of the housing 52, wherein the body 51 is fastened via a mechanical holder 53. The body 51 comprises praseodymium and cerium.

The body 51, comprising the combination of praseodymium and cerium, emits light of a different, in particular longer, wavelength after excitation with the transmitted light, in particular by absorption of the transmitted light. Precisely speaking, it is the material combination of praseodymium and cerium that emits received light, i.e., fluorescent light. This fluorescence is a spontaneous emission of the material combination of praseodymium and cerium after the excitation thereof with transmitted light 8 from the light source 1.

The body 51 is, for example, designed as a glass body. The glass body is made of an inorganic glass, e.g., of barium phosphate glass or a quartz glass. The glass body 51 is doped with the praseodymium and cerium. The glass as such is transparent to the transmitted and received light; the glass doped with praseodymium and cerium fluoresces. In one embodiment, the body 51 is made of plastic.

In general, the body 51 per se is substantially transparent to the emission wavelengths used and to the light converted by fluorescence. The body 51 is thus translucent to the transmitted light. In this respect, the body 51 behaves similarly to the medium to be measured.

The body 51 obviously has volume, i.e., is a three-dimensional object. This has the advantage that the fluorescence can arise from the entire volume of the body 51. In contrast to two-dimensional calibration plates, a larger region (a larger volume) is thus activated for the fluorescence. The fluorescence is thus greater, and a smaller amount of praseodymium and cerium can be used. The calibration attachment 50 can be designed to be smaller, which is advantageous, particularly in the (re)calibration "in the field." In addition, two-dimensional calibration plates require a more accurate alignment to the light source, also in order to achieve a reproducible result.

The sensor arrangement 200 is designed for applications in liquids (i.e., in a volume of measuring medium). The measurement/calibration with the calibration attachment 50 is thus closer to the normal measuring principle, and the measurement value or the sensor behavior in liquids can be precisely reproduced.

In addition, the spatial alignment of the calibration attachment 50 in the embodiment as a volume body to the sensor can be less accurate.

The body 51 is designed to be disk-shaped or lens-shaped. However, the basic idea of the present invention also works with fragments or over an arbitrarily shaped part.

FIG. 3 thus shows the sensor arrangement 200 comprising the sensor 100 and the calibration attachment 50.

FIG. 4 shows the body 51 with praseodymium.

FIG. 5*a* shows an emission spectrum 30 of the body 51 at an excitation wavelength of 254 nm. FIG. 5*b* shows the corresponding fluorescence spectrum 31 of a PAH, here of naphthalene by way of example. The spectra in FIG. 5*b* and FIGS. 6*b-d* are taken from the freely reachable "omlc database," found at https://omlc.org/spectra/index.html.

Instead of a broader emission of a solid that only contains cerium (reference sign 32), the emission spectrum 30 can be tailored, i.e., for example, changed similarly to emission spectra of hydrocarbons such as naphthalene. This is a surprising effect which can only be achieved by the combination of cerium and praseodymium.

In comparison to a pure cerium or praseodymium doping (reference sign 32 or 33), the absorption by the combination doping of cerium and praseodymium (reference sign 30) becomes more similar to the absorption range of PAHs, such as naphthalene or phenanthrene. The measurements in FIGS. 5*a*-5*b* show that the absorption edge of cerium and praseodymium is hyposochromically shifted (to shorter wavelengths) in comparison to a pure cerium doping (reference sign 32) at approximately 300 nm.

FIG. 6*a* shows an emission spectrum 30 of the body 51 at a different excitation wavelength than in FIGS. 5*a*-5*b*, namely at 440 nm. Shown also are the fluorescence spectra 31 of fluorescein (FIG. 6*b*), rhodamine (FIG. 6*c*) and chlorophyll (FIG. 6*d*). It can be seen that in the emission spectrum 30, in the combination of cerium and praseodymium, the bands are at approximately 440 nm and 640 nm, i.e., precisely at the wavelengths at which fluorescein, rhodamine, and chlorophyll have bands.

This shows that different analytes can be calibrated with a solid standard 51 comprising cerium and praseodymium. Corresponding, possibly different, excitation wavelengths are used, which are used in one or more fluorescence measuring devices 200.

It has been found that not all lanthanides or all rare-earth metals are equally suitable, despite the similarities that this group has. The combination of praseodymium and cerium has the precisely correct and sufficiently strong fluorescence signal, which a single rare-earth metal, for example, does not have. Depending on the application, see the figures described above, a single rare-earth metal has properties that are completely wrong, i.e., has an unsuitable fluorescence signal. This is, for example, apparent in comparison to the measurement of naphthalene or fluorescein.

The invention claimed is:

1. A calibration attachment for adjusting, calibrating, and/or performing a functional check of an optical sensor, which is configured to measure at least one measured variable in a medium using light, wherein the sensor is configured to emit transmitted light of at least one wavelength in a range of 200-700 nm, the calibration attachment comprising:
- a housing; and
- a body, which is disposed in the housing such that the transmitted light from the sensor is incident on the body,
- wherein the body comprises praseodymium and cerium such that the praseodymium and cerium interact synergistically, and
- wherein the body, upon excitation with the transmitted light, emits light of a different wavelength than the at least one wavelength of the transmitted light from the sensor.

2. The calibration attachment according to claim 1, wherein the emitted light of the different wavelength is a longer wavelength than the transmitted light.

3. The calibration attachment according to claim 1, wherein the emission of the light of the different wavelength occurs within a volume of the body.

4. The calibration attachment according to claim 1, wherein the body is a glass body.

5. The calibration attachment according to claim 4, wherein the glass body is made of barium phosphate glass or quartz glass.

6. The calibration attachment according to claim 4, wherein the glass body is doped with praseodymium and cerium.

7. The calibration attachment according to claim 1, wherein the body is made of a plastic material doped with praseodymium and cerium.

8. The calibration attachment according to claim 1, wherein the housing completely encloses the body, and
- wherein the housing is hermetically sealed from its environment.

9. The calibration attachment according to claim 1, wherein the body as such is substantially transparent to the transmitted light and the emitted light of the different wavelength.

10. The calibration attachment according to claim 1, wherein the surface of the body is substantially smooth.

11. The calibration attachment according to claim 1, wherein the body is configured as a three-dimensional object.

12. The calibration attachment according to claim 11, wherein the body is configured in a disk-shape or lens-shape.

13. The calibration attachment according to claim 1, wherein the body is mounted in the housing via a mechanical holder.

14. The calibration attachment according to claim 1, wherein the housing comprises a receptacle adapted to retain the sensor.

15. The calibration attachment according to claim 1, wherein the housing is substantially transparent to the transmitted light from the sensor.

16. The calibration attachment according to claim 1, wherein the housing includes an opening such that the transmitted light from the sensor is incident on the body through the opening.

17. A sensor arrangement, comprising:

a sensor, comprising:

at least one light source, wherein the at least one light source emits transmitted light of at least one wavelength in a range of 200-700 nm; and at least one receiver configured to receive received light of a longer wavelength than the at least one wavelength of the transmitted light; and the calibration attachment according to claim 1, wherein the emitted light from the body is the received light.

18. The sensor arrangement according to claim 17, wherein the longer wavelength of the received light is 250-800 nm.

19. A method of adjusting, calibrating, and/or performing a functional check of an optical sensor, the method comprising:

exciting a body doped with praseodymium and cerium that interact synergistically with light transmitted from the optical sensor, wherein the optical sensor is configured to emit the transmitted light at at least one wavelength in a range of 200-700 nm.

20. A method of adjusting, calibrating, and/or performing a functional check of an optical sensor, the method comprising:

exciting a body doped with praseodymium and cerium that interact synergistically with light transmitted from the optical sensor, wherein the optical sensor is configured to determine the content of a polycyclic aromatic hydrocarbon in a sample.

21. A method of adjusting, calibrating, and/or performing a functional check of an optical sensor, the method comprising:

exciting a body doped with praseodymium and cerium that interact synergistically with light transmitted from the optical sensor, wherein the optical sensor is configured to determine the content of biomass, including chlorophyll and/or algae.

22. A method of adjusting, calibrating, and/or performing a functional check of an optical sensor, the method comprising:

exciting a body doped with praseodymium and cerium that interact synergistically with light transmitted from the optical sensor, wherein the optical sensor is configured to determine the content of a rhodamine and/or fluorescein, including uranine.

* * * * *